United States Patent [19]

Foster, Jr.

[11] Patent Number: 5,720,327
[45] Date of Patent: Feb. 24, 1998

[54] VEHICLE SAFETY FUELING SYSTEM

[76] Inventor: James C. Foster, Jr., 219 Meadow La., Easley, S.C. 29642

[21] Appl. No.: 652,960

[22] Filed: May 24, 1996

[51] Int. Cl.$^6$ ............................................. B65B 1/04
[52] U.S. Cl. ........................... 141/207; 141/94; 141/86.2; 123/198 DC
[58] Field of Search ............................ 141/207, 94, 392, 141/311 A, 285; 220/86.2; 307/10.3, 10.6; 123/198 DC

[56] References Cited

U.S. PATENT DOCUMENTS

| | | |
|---|---|---|
| 3,062,247 | 11/1962 | Botkin . |
| 3,642,036 | 2/1972 | Ginsburgh et al. . |
| 3,786,207 | 1/1974 | Houston et al. ........................ 141/207 |
| 4,109,686 | 8/1978 | Phillips ...................................... 141/94 |
| 4,469,149 | 9/1984 | Walkey et al. . |
| 5,004,023 | 4/1991 | Monticup, Jr. et al. . |
| 5,329,164 | 7/1994 | Saito ................................. 123/198 DC |
| 5,383,500 | 1/1995 | Dwars et al. . |
| 5,385,182 | 1/1995 | Dyer . |

*Primary Examiner*—David J. Walczak
*Assistant Examiner*—Steven O. Douglas
*Attorney, Agent, or Firm*—Dority & Manning, P.A.

[57] ABSTRACT

A safety device for vehicles for preventing accidental driving off with the vehicle from a fuel pump without first removing a fuel dispensing nozzle from the tank of the vehicle. When the fuel dispensing nozzle is in the spout of the tank, a solenoid valve is activated to disengage the ignition system and/or illuminate alarm lights and audible signals.

2 Claims, 4 Drawing Sheets

VEHICLE SAFETY FUELING SYSTEM

BACKGROUND OF THE INVENTION

This invention relates to a safety device for vehicles for preventing the accidental driving off of the vehicle from a fuel pump without first removing a fuel dispensing nozzle from the tank of the vehicle. More particularly, the device is designed to prevent a vehicle from being driven away from a fueling site while the gasoline nozzle is still inserted in the fuel spout by either sounding an alarm indicating that the fuel nozzle is in the tank or by disengaging the ignition system of the vehicle while the fuel nozzle is inserted into the fuel tank.

It is known to provide fuel nozzles with emergency shut-off in the event a vehicle is driven off from the fuel station while the nozzle is in the tank of the vehicle. One such device is disclosed in U.S. Pat. No. 5,004,023 that incorporates a liquid dispensing nozzle that includes a break-away outlet portion and an emergency shut-off mechanism. The emergency shut-off is actuated by separation of the outlet portion of the nozzle from the body of the nozzle. The emergency shut-off includes a valve mechanism which when closed stops the flow of liquid.

Another fuel nozzle safety device is disclosed in U.S. Pat. No. 5,385,182. This device includes a fuel nozzle safety break-away device that comprises a clamp clamped to the nozzle. A latch is pivotally connected to the clamp and structure for disconnecting the latch from the clamp at a predetermined force less than that required to break the nozzle from the dispenser.

Still another safety device is disclosed in U.S. Pat. No. 3,062,247 which utilizes a specially designed dispensing nozzle having a discharge tube that is inserted in a gasoline tank and is adapted to break off from the nozzle at a predetermined load producing a distinctively audible signal thereby warning the attendants that the mishap has occurred.

U.S. Pat. Nos. 3,642,036 and 5,383,500 disclose automatic fuel systems for automobiles. In U.S. Pat. No. 3,642,036, there is disclosed a system for automatically fueling an automotive vehicle comprising a moveable fuel dispenser including a nozzle which is adapted to be coupled to the fuel inlet of the vehicle and programmable moving means connected to the fuel dispenser for moving the dispenser into a position where the nozzle can be coupled with the fuel inlet. On the vehicle there is a signal generating means which provides a signal indicating where the fuel dispenser should be moved relative to the fuel inlet. A detector actuated by this signal programs the moving means to move the dispenser to the corrected fueling position.

In one particular embodiment proximity sensors provide a signal which indicates that the nozzle is properly coupled to the fuel inlet.

In U.S. Pat. No. 5,383,500, the system for automatically refueling of automotive vehicles includes a processing unit which controls the automatic insertion of fuel into the tank of the vehicle.

While such prior art devices aid in solving the consequences of a driver driving off from a fueling station prior to removing the fuel nozzle, they generally do not concentrate on solving the problem of preventing the driver from driving off.

Accordingly, it is an object of the present invention to provide an apparatus which will prevent a driver from driving off from a fueling station while a fuel nozzle is inserted in the tank of the vehicle.

Another object of the invention is to provide an alarm system for informing a driver of the vehicle that a fueling nozzle is inserted in the tank of a vehicle.

Still another important object of the invention is to provide a system wherein the ignition system of a vehicle is disengaged during the fueling of the vehicle and remains disengaged until the fuel nozzle is removed from the tank of the vehicle.

The foregoing object and still other objects and advantages of the present invention will become apparent upon reference to the following specification taken in connection with the accompanying drawings in which:

SUMMARY OF THE INVENTION

A safety device for use on vehicles for insuring that a fuel nozzle has been removed from an inlet spout of a fuel tank of a vehicle prior to the vehicle being driven off. The device includes a switch which is carried adjacent the inlet spouts having a first position and a second position. The switch is located so that when a fuel nozzle is inserted into the inlet spout, the switch is changed from a first position to the second position to activate a condition responsive device. The condition responsive device is incorporated in an electric circuit which includes a power supply. In one embodiment, the condition responsive device is an alarm whereas in another embodiment, the condition responsive device is a relay that deactivates the ignition system of the vehicle. Any suitable switch can be utilized in the spout of the gas tank as long as it is activated when the nozzle carried on the end of the gasoline hose is inserted in the filling spout. In the preferred embodiment, the switch is a proximity switch.

DESCRIPTION OF A PREFERRED EMBODIMENT

Figure 1:
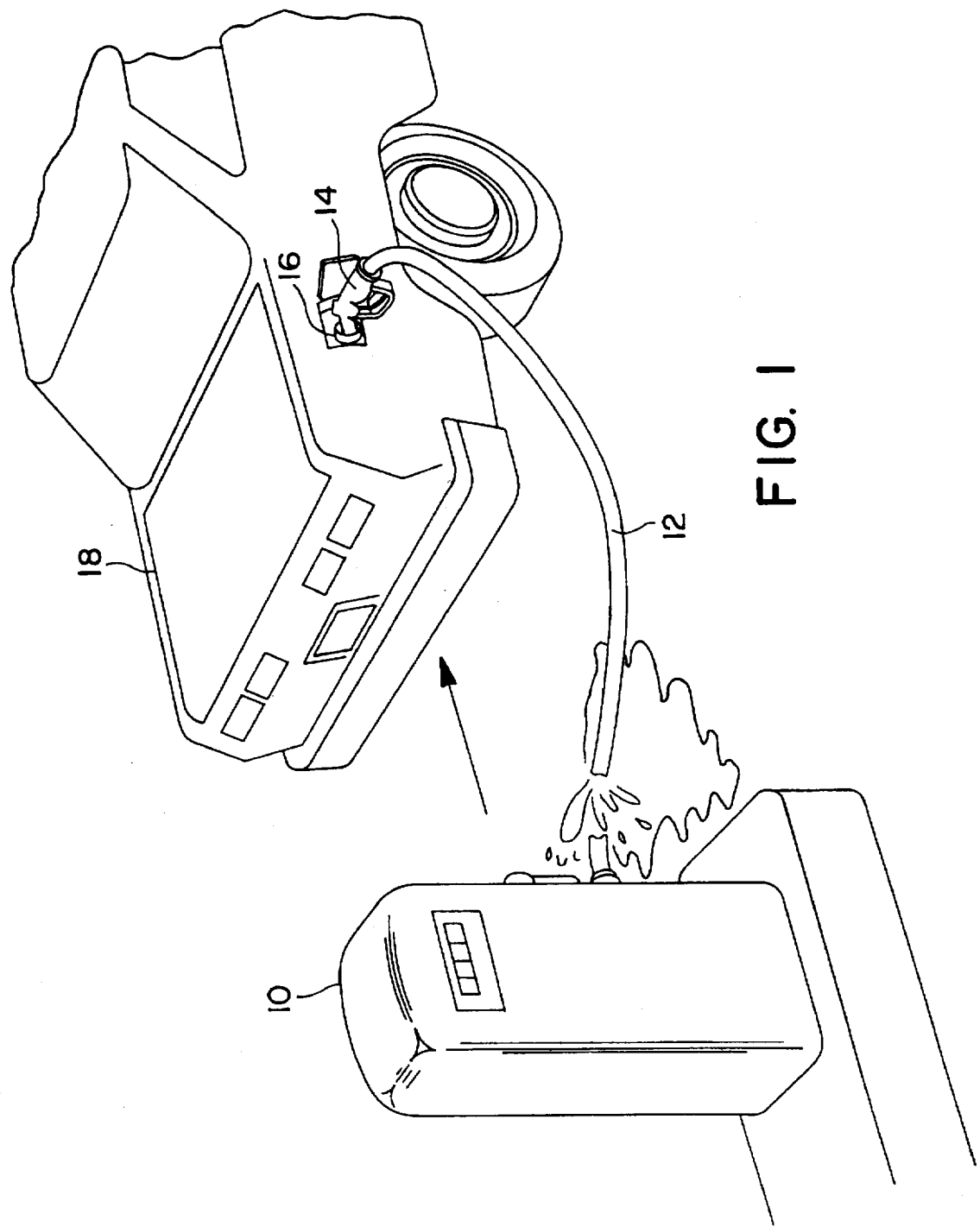
FIG. 1 is a perspective view illustrating a vehicle driving off from a fueling station breaking the fuel line.
Figure 2:
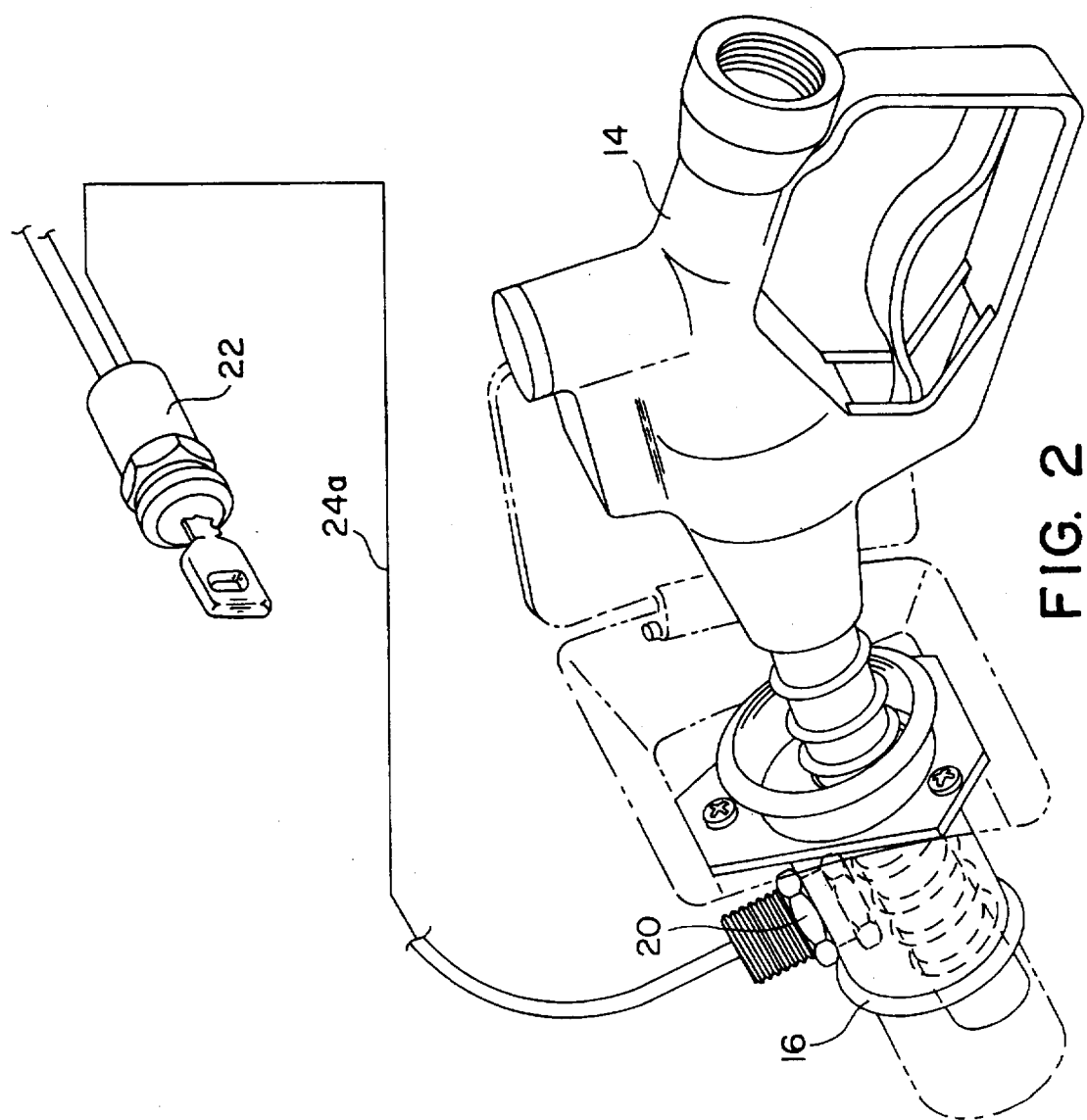
FIG. 2 is a perspective view of a fuel nozzle being inserted into a tank of a vehicle equipped with a safety device constructed in accordance with the present invention.

Referring to FIG. 1 of the drawings, there is disclosed a conventional gas pump 10 which has a hose 12 extending therefrom that carries fuel such as gasoline to an elongated filling nozzle 14 which can be inserted in a spout 16 of a gas tank of a vehicle 18. As can be seen in FIG. 1, the hose or nozzle is subject to be broken if the vehicle drives off from the pump 10 prior to removing the filling nozzle from the spout. This can be extremely dangerous in that gasoline is subject to being spilled on the ground adjacent the pump. If a spark is generated by the hose dropping to the ground or by some other means, it is possible that the gasoline could be ignited. Another serious problem is contamination of the area around the pump 10 with gasoline.

In order to prevent the vehicle from driving off from the pump prior to removing the elongated nozzle 14, an electrical circuit including a proximity switch 20 is incorporated in the filling spout 16 associated with the gas tank of the vehicle. The proximity switch is connected to the ignition switch 22 of the vehicle by leads 24a shown schematically so that when the proximity switch is closed, it will cause the ignition switch to be deactivated. The complete electrical circuit for deactivating the ignition system for the vehicle is shown in greater detail in FIGS. 5.

Figure 3:
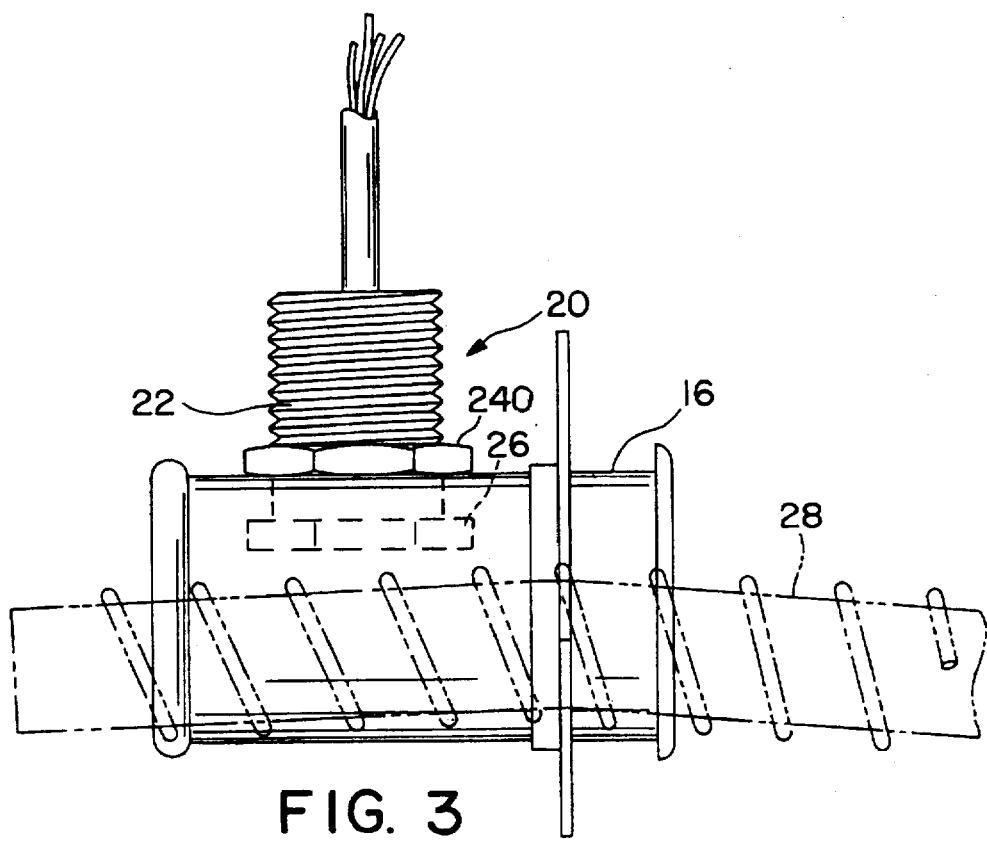
FIG. 3 is an enlarged side elevational view showing a fuel nozzle inserted into the filling tube of a tank of a vehicle.
Figure 4:
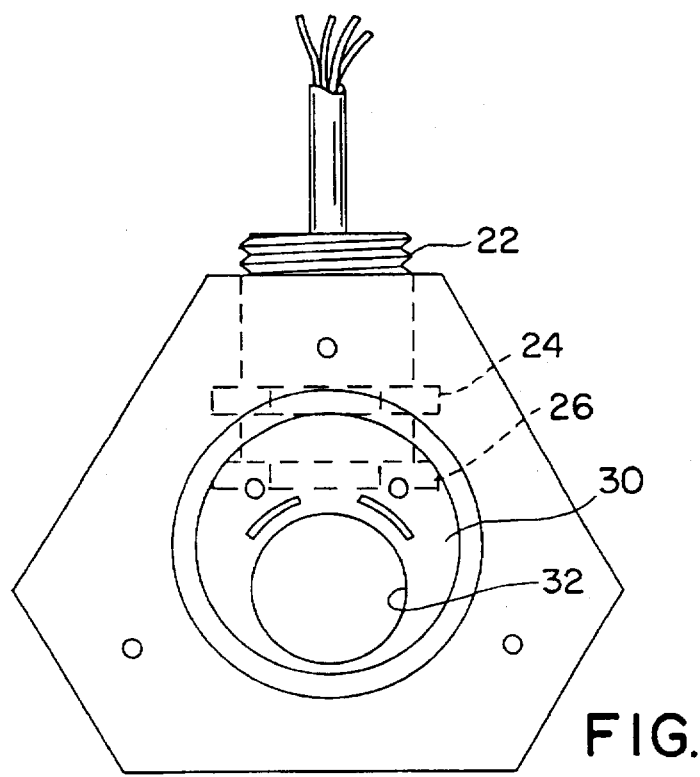
FIG. 4 is an elevational view looking directly into an inlet spout of a fuel tank equipped with a sensor constructed in accordance with the present invention.

The proximity switch 20 is enclosed within a housing 22 that has threads provided on the outer surface thereof. The elongated cylindrical housing 22 extends through an opening provided in the wall of an elongated body portion of the filling spout 16 of the gas tank. Lock nuts 24 and 26 are provided for securing the proximity switch in the wall of the filling spout. Suitable sealing material can be incorporated between the two nuts 24 and 26 for providing a seal so that gas cannot escape through the opening through which the proximity switch extends. As shown in FIG. 3, an outer end 28 of the nozzle is allowed to pass adjacent the proximity switch 20 during the filling operation. When this occurs, a normally open contact carried within the proximity switch 22 is closed. This causes a circuit to be completed to disengage the ignition system of the vehicle. The inlet spout 16 has a splash plate 30 provided adjacent its outer end. This splash plate has a hole 32 provided therein for receiving the end 28 of the nozzle during the filling operation.

Figure 5:
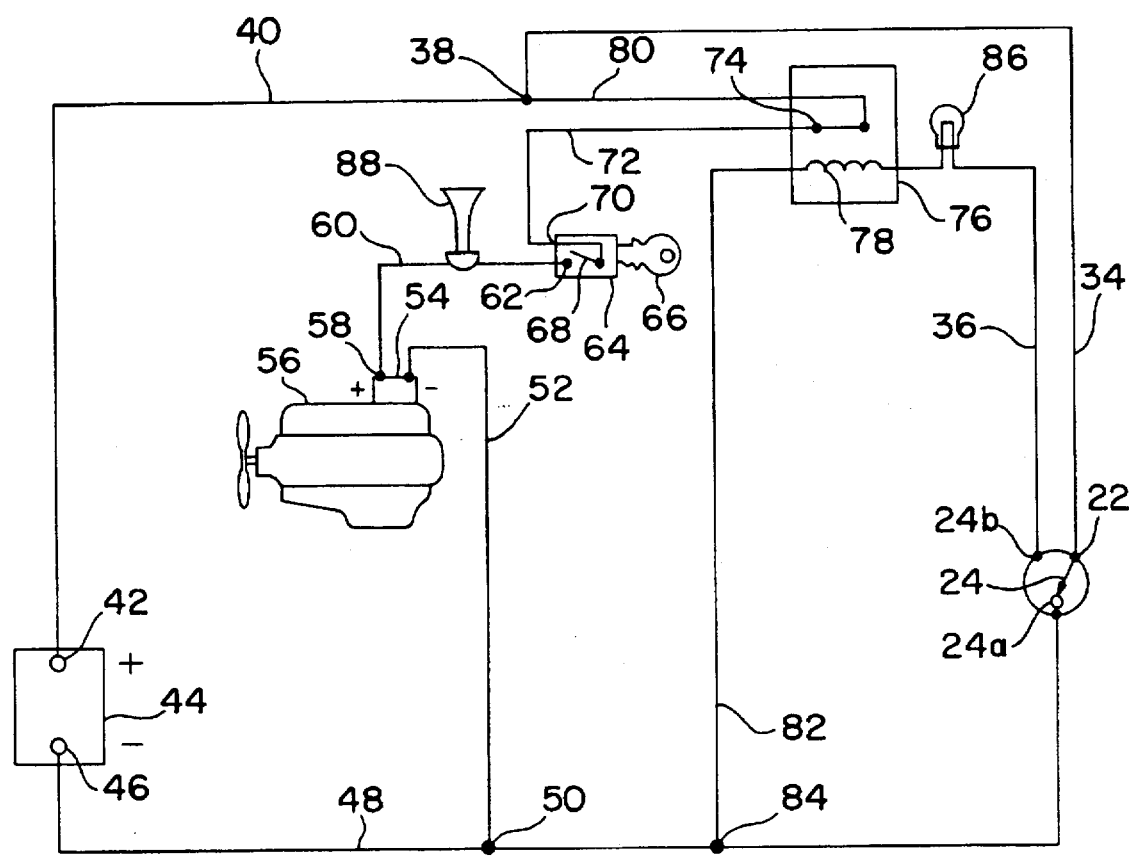
FIG. 5 is a schematic diagram illustrating the electrical circuit for the safety device constructed in accordance with the present invention.

Referring now to FIG. 5 of the drawings, the proximity switch 22 includes a normally open contact 24. When the nozzle is inserted within the inlet spout, the contact 24 moves from the normally open position where it is in contact with terminal 24a to the normally closed position where it is in contact with terminal 24b. When this occurs, a circuit is completed between lead lines 34 and 36. Lead 34 is connected to junction 38 which is interposed in lead 40. One end of lead 40 is connected to the positive terminal 42 of a battery 44. A negative terminal 46 of the battery 42 is connected through lead 48 to a first junction 50. Junction 50 is connected by a wire or lead 52 to a negative side of a starter 54 for an engine 56 of the vehicle. The positive side of the starter 58 is connected through a lead 60 to one terminal 62 of the ignition switch 64. A key 66 is provided for moving a moveable contact 68 forming part of ignition switch from an open position as shown to a closed position where it is in contact with terminal 62. Another terminal 70 of the ignition switch is connected by means of lead 72 to a normally closed contact 74 of a relay 76. A solenoid 78 for the relay is used for opening and closing the contact 74. The other side of the contact 74 is connected by means of a lead 80 to junction 38. As previously mentioned, junction 38 is connected through lead 40 to the positive side of the battery 44.

When the end 28 of the nozzle is inserted within the inlet spout 16, it causes the contact 24 of the proximity switch to move from its normally open position where it is in contact with terminal 24a to a closed position where it is in contact with terminal 24B. Terminal 24B of the proximity switch is connected through lead 36 to one side of solenoid 78. The other side of solenoid 78 is connected through lead 82 to terminal 84 that in turn is connected through lead 48 to the negative side 46 of the battery 44.

In operation, when the nozzle 28 is inserted in the inlet spout, it causes moveable contact 24 of the proximity switch to move to the normally closed position where it makes connection between leads 34 and 36. This causes the solenoid 70 of the relay to be energized causing the normally closed contact 74 to open. When the normally closed contact 74 is opened, the circuit between the ignition switch and the battery 44 is open. This circuit includes the battery 44, lead 40, open contact 74, lead 72, the key switch contact 68 and lead 60, which is connected to one side of the starter. The other side of the starter is connected through lead 52 and 48 back to the negative side of battery 46. Since-contact 74 is open, it is not possible to start the engine of the vehicle. Upon removing the nozzle 28 from the inlet spout, the moveable contact 24 of the proximity switch 22 moves back to its normal open position wherein it is in contact with terminal 24a. The circuit including the solenoid 78 is then opened and the relay 76 is deenergized. Upon deenergization of the relay 76, the normally closed contact 74 returns to its original normally closed position completing a circuit to the key switch so that when the key 66 is rotated the moveable contact 68 closes providing current to the starter 54 of the engine.

A lamp 86 interposed in lead 36 is illuminated during the filling operation to generate a visual signal indicating that the nozzle 28 is in the spout 16. A horn 88 can be connected in lead 60. The horn generates an audible signal upon rotating the key 66 when the nozzle 28 is in the spout 16.

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. While particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

I claim:

1. A safety device for use on vehicles for ensuring that an elongated fuel nozzle is removed from an inlet spout of a fuel tank for said vehicle prior to said vehicle being driven off from a fuel supply, said inlet spout having a cylindrical cross section and an elongated body portion, said safety device comprising:

a power supply;

an engine for propelling said vehicle;

an electric starter connected to said engine;

a key operated switch;

an electric circuit connecting said key operated switch to said power supply and said starter;

a proximity switch adapted to be carried adjacent said elongated body portion of said inlet spout having a first position and a second position;

said proximity switch being located so that when said elongated fuel nozzle is inserted in said elongated body portion of said inlet spout said proximity switch is activated to changed from said first position to said second position;

a relay connected to said proximity switch that is activated when said switch is in said second position;

said relay being connected to said electric circuit for opening said electric circuit and preventing said starter from being energized.

2. The safety device as set forth in claim 1, further comprising:

an alarm that is energized by said power supply when said proximity switch is in said second position.

\* \* \* \* \*